(12) United States Patent
Cofer

(10) Patent No.: US 6,424,874 B1
(45) Date of Patent: Jul. 23, 2002

(54) AUTOMATED CONFIGURATION OF COMMUNICATIONS FOR AN ORDERED COLLECTION OF DEVICES

(75) Inventor: Darren Duane Cofer, Minnentonka, MN (US)

(73) Assignee: Honeywell International Inc., Morristown, NJ (US)

( * ) Notice: Subject to any disclaimer, the term of this patent is extended or adjusted under 35 U.S.C. 154(b) by 26 days.

(21) Appl. No.: 09/606,711

(22) Filed: Jun. 29, 2000

(51) Int. Cl.⁷ .............................................. G05B 11/32
(52) U.S. Cl. .............................. 700/56; 700/28; 700/59
(58) Field of Search .............................. 700/18, 28, 56, 700/59, 173, 181

(56) References Cited

U.S. PATENT DOCUMENTS

| | | | | |
|---|---|---|---|---|
| 3,746,845 A | * | 7/1973 | Henegar et al. | 700/181 |
| 4,029,950 A | * | 6/1977 | Haga | 700/181 |
| 4,513,379 A | * | 4/1985 | Wilson et al. | 700/181 |
| 4,639,653 A | * | 1/1987 | Anderson et al. | 700/181 |
| 4,907,163 A | * | 3/1990 | Cook | 700/173 |
| 5,561,770 A | * | 10/1996 | de Bruijn et al. | 700/18 |
| 6,048,086 A | * | 4/2000 | Valerino, Sr. | 700/173 |
| 6,101,425 A | * | 8/2000 | Govindaraj et al. | 700/181 |
| 6,115,646 A | * | 9/2000 | Fiszman et al. | 700/181 |
| 6,144,895 A | * | 11/2000 | Govindaraj et al. | 700/181 |

* cited by examiner

Primary Examiner—Stephen T. Gordon
Assistant Examiner—Lori L Coletta
(74) Attorney, Agent, or Firm—Kris T. Fredrick

(57) ABSTRACT

Device configuration information is automatically determined with respect to a physical process that multiple devices monitor or control. The physical process is exercised, with each device tracking progression of the process and determining a preceding device and a successor device. Messages are produced in a configuration mode by each device in a system indicating when some phase of the process monitored by the device begins and ends.

11 Claims, 7 Drawing Sheets

AUTOMATED CONFIGURATION OF COMMUNICATIONS FOR AN ORDERED COLLECTION OF DEVICES

FIELD OF THE INVENTION

The present invention relates to communications, and in particular to the configuration of communications for an ordered collection of devices.

BACKGROUND

Many large systems today are composed of or include a collection of "smart" devices with a common communication infrastructure such as a network. The devices may implement sensing or control functions and are "smart" in the sense that they contain a microcontroller that regulates their processing and communication activities. Such devices normally must be programmed with certain application-specific configuration information before they can operate correctly. This configuration process can be costly and time consuming.

Often, a physical process that the devices are monitoring or controlling imposes an implicit ordering on the devices. For example, a collection of controllers for conveyor segments that pass boxes or trays to one another on a manufacturing line is ordered by the arrangement of the conveyor segments. Another example is a collection of sensors arranged in a regular array, such as a line or a grid, for gathering data over a wide area.

A collection of devices with such an ordering normally requires some configuration information to be supplied during system installation before correct operation is possible. This configuration information specifies for each device which of the other devices in the collection are its predecessor and successor with respect to the order.

In prior systems, the configuration information has been provided by the system designer or installer, who assigns each device a location and uses the assignment to determine the device order. Manual determination and programming of the ordering configuration is time-consuming and error prone. The configuration process becomes a significant part of total system cost, both for new installations and during modifications to the system. If the system is modified after configuration, the configuration information must be re-determined and reprogrammed.

In other prior systems, a wiring connection between devices directly links each device to its predecessor and successor in the system. There is a direct physical connection, such as one wire by which a device communications with its predecessor during operation, and a separate wire for communicating with its successor. Both wires are in addition to any network connection that the devices may have. Such direct wiring adds cost for both material and installation. It also increases hardware complexity, at least due to the need for ore connectors. For a networked collection of devices, such a direct physical connection is a redundant communication channel that takes more space and increases cost.

There is a need to determine configuration information quickly and inexpensively. There is also a need to use such configuration information to quickly configure devices. There is a further need to re-configure devices to accommodate changes while the system is operating.

SUMMARY OF THE INVENTION

Device configuration information is automatically determined with respect to a physical process that the multiple devices monitor or control. The physical process is exercised, with each device tracking progression of the process and determining a preceding device and a successor device.

In operation, messages are produced in a configuration mode by each device in a system indicating when some phase of the process being monitored begins and ends. These messages are different from normal process messages to enable configuration to occur during normal operation of the system. Once a device has sent both the begin and end configuration messages, it returns to normal operation.

In one embodiment, each device is a controller associated with a segment of a conveyor line. A load is placed on one of the initial segments of the conveyor line and is transferred along a path until it reaches some terminal segment. As a segment is encountered by the load, the associated controller broadcasts a configuration receive message. As the load exits the conveyor segment, a configuration send message is broadcast. A source address is affiliated with each such message, allowing other controllers to determine which segment a load came from. The messages enable the correct controller to configure itself as a succeeding node, and the predecessor controller configures itself as a predecessor to the node that received the load.

DETAILED DESCRIPTION

In the following description, reference is made to the accompanying drawings which form a part hereof, and in which is shown by way of illustration specific embodiments in which the invention may be practiced. These embodiments are described in sufficient detail to enable those skilled in the art to practice the invention, and it is to be understood that other embodiments may be utilized and that structural, logical and electrical changes may be made without departing from the scope of the present invention. The following description is, therefore, not to be taken in a limited sense, and the scope of the present invention is defined by the appended claims.

The description is divided into multiple sections. The first section provides an overview of a material handling system. The second section describes the operation of material handling system, and a third section describes different embodiments.

Figure 1:
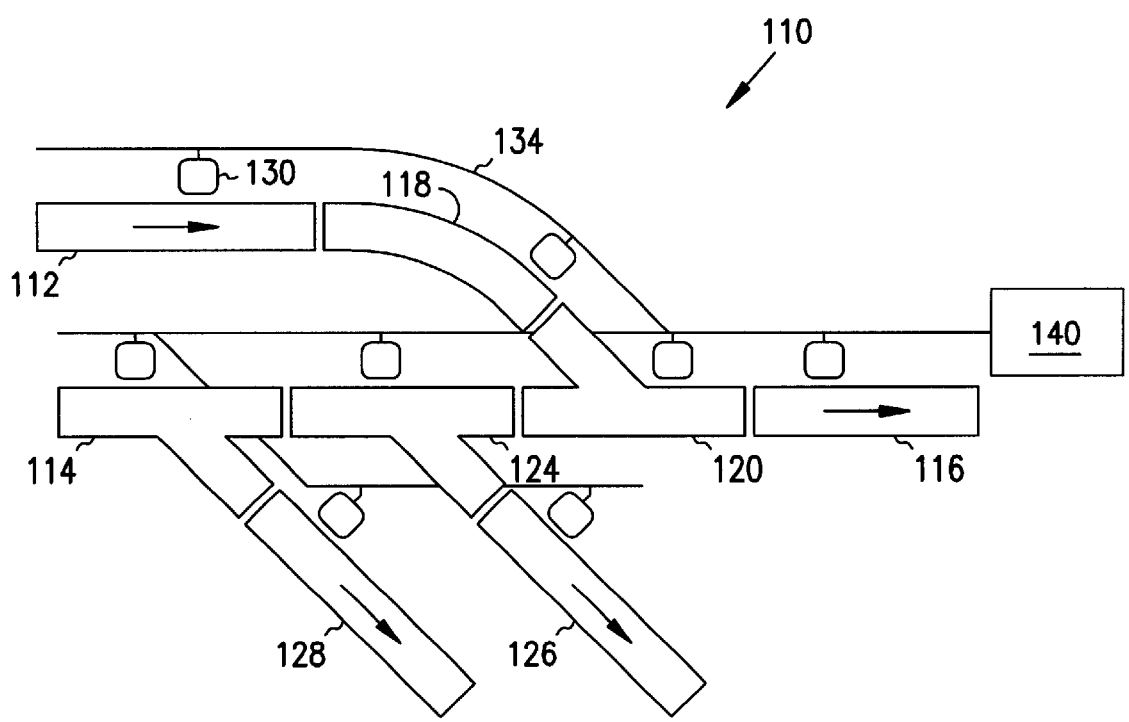
FIG. 1 is a block diagram of a conveyor system with multiple control modules

Automatic configuration of communications for an ordered collection of networked devices is performed by the present invention. In one embodiment as shown in FIG. 1 generally at 110, a material handling system is used to illustrate the invention. The material handling system 110 comprises a number of conveyor segments 112, 114, 116, 118, 120, 124, 126 and 128. The conveyor segments are used to transport an item such as a box to different locations as desired. Each conveyor segment contains a motor to move the item to succeeding conveyor segments. Each conveyor segment also contains a control module such as controller 130. The controllers are communicatively coupled by a network 134. In one embodiment, the controllers provide distributed control of the material handling system. In a further embodiment, a central controller 140 controls the segment controllers.

The controllers 130 may be hardwired devices, computer systems, or any other type of device that can control the transport of an item over its associated segment. It has the ability to detect when an item is entering the segment, and when the item is leaving the segment such as by use of a photo eye or other sensor. It can start and stop the motor powering the segment in accordance with such detection if desired. It may also have memory or storage with instructions to perform multiple functions. The network 134 may be any type of network which can provide communications between the controllers, and/or to central controller 140, which may be a microprocessor with memory or storage holding computer instructions. Many types of hardwired or wireless communication networks may be used, and need not be of high bandwidth for purposes of this invention.

Material handling system 110 has different types of conveyor segments illustrated. Each segment has a lead zone, which is an initial zone of a conveyor segment during forward operation. It may include a sensor or other device coupled to its associated controller to indicate when an item has entered the lead zone. A final zone of a conveyor segment is the last zone during forward operation. A sensor or other device provides an indication to the associated controller when the item has left the final zone.

Of importance to the automatic configuration of controllers/devices is the order in which they operate during normal operation of the material handling system 110. Each conveyor segment may have a predecessor, which is an immediate upstream device during forward operation, and a successor, which is an immediate downstream device during forward operation. Variables in each device, or in the central controller are used to store identifications of predecessor and successor devices for each device. Automatic configuration comprises automatically determining preceding and succeeding devices for each device.

In operation, an item is transferred along a path in the material handling system, and each controller publishes messages when the item enters and exits the controller's associated conveyor segment. Placing the item on the path may be thought of as initiating an event, and as the item moves along the path, the event may be thought of as propagating the event.

A receive message is sent when an item enters the initial zone of the conveyor segment, and a send message is sent when an item leaves the final zone of the conveyor segment. The device entering or leaving a segment can be detected by a switch or other means, such as a motion detector or photoelectric sensor. A segment can also know how far it needs to transport an item, and then send the send message. There are many other means by which boxes may be detected as entering or leaving a segment.

The following properties hold for each controller. A send message observed immediately before the item enters a conveyor segment was published by its predecessor conveyor segment controller, and a receive message observed immediately after an item exits a conveyor segment was published by its successor. These properties allow the controllers to identify preceding and succeeding controllers, and to save identifications of them in storage.

The transfer of an item over unconfigured control modules may also be accomplished by simply forcing all zones to run their motors. Transfer can also be accomplished by simply forcing a lead zone of each multi-zone segment to run its motor. Once an item reaches the lead zone of a segment, internal control logic is able to continue transferring the item to the final zone of the segment.

In a normal distributed control implementation, each controller normally broadcasts messages indicating that an item is exiting the conveyor segment, and that the conveyor segment is full. During automatic configuration of the controllers, different messages are broadcast. The send message indicates that the item is exiting the conveyor segment, and the receive message indicates that the item is entering the conveyor segment. Using a different set of messages permits autoconfiguration of new control modules to be accomplished without interference from normal operation of configured control modules already coupled to the network. Controllers in configuration mode can then ignore the normal broadcast messages.

Figure 2:
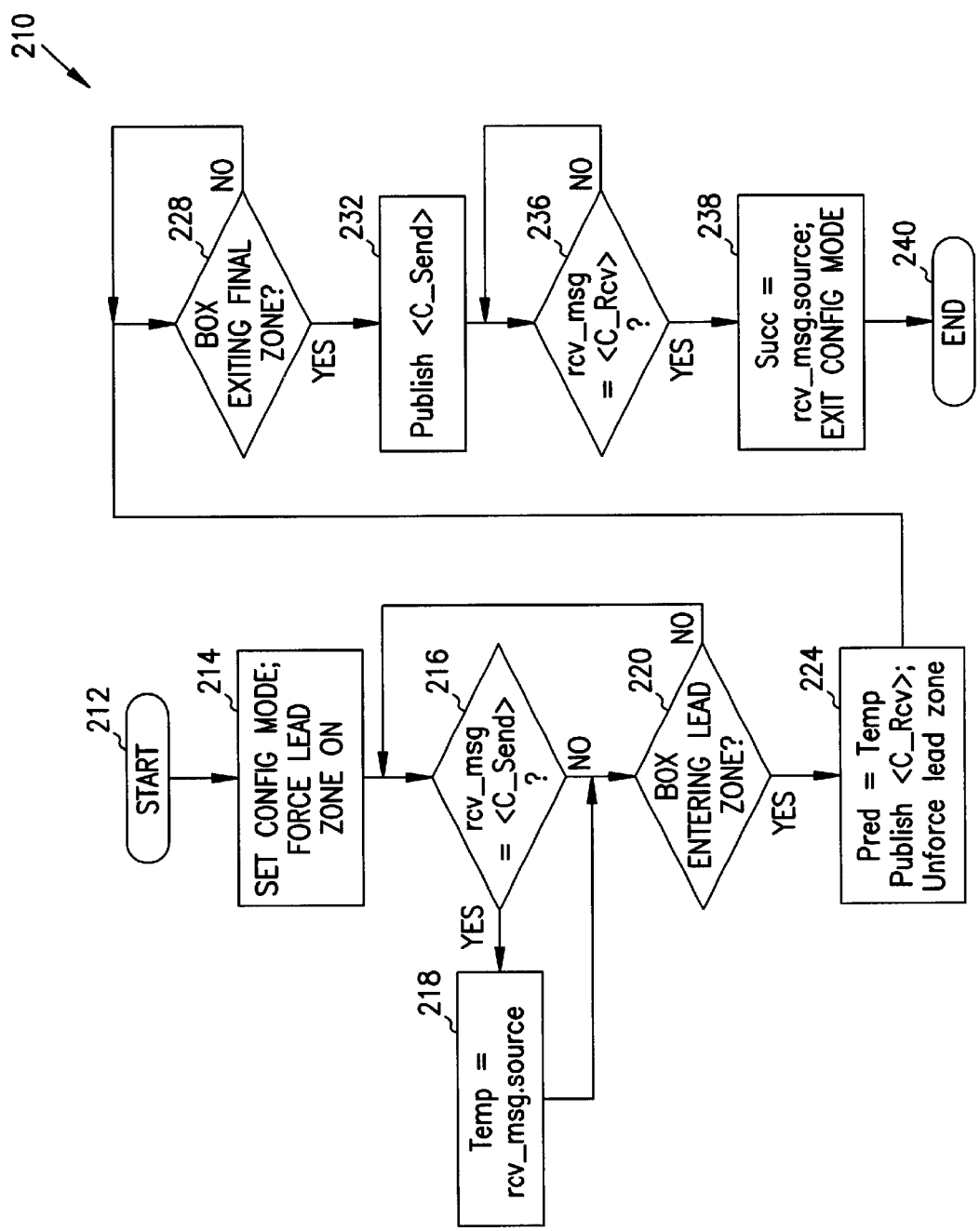
FIG. 2 is a flow chart showing auto configuration of the control modules of FIG. 1.

A flowchart in FIG. 2 illustrates the operations performed in the autoconfiguration of a distributed set of controllers. FIGS. 3, 4, 5 and 6 show three example conveyor segments with four zones each, and the data that is stored regarding the autoconfiguration.

In FIG. 2, an autoconfiguration process executed by each controller in a distributed control conveyor system is indicated generally at 210. The process is initiated at start step 212. At 214, the controller is set to the configuration mode. All messages except send and receive messages are ignored once a controller is set to configuration mode. In addition, the controller forces it's lead zone motor to run so that an item such as a box can be transferred during the configuration. At 216, the controller waits for a send message from other devices, saving a source address from the most recent send message. If a send message is received, a temporary storage location, Temp, is set to the address of the receive message at 218. If so, or if a send message was not received at 216, step 220 determines if a box is entering the controller's associated lead zone. If it is not, the controller waits for another message at 216. If a box is entering the lead zone, the last upstream controller is determined to be the predecessor, and its address is stored as such at 224 by taking the address from Temp. Also, at 224, a receive message is sent by the controller, and the lead zone is unforced. When a zone is unforced, normal internal control logic will continue to run the zone until the box exits. At 228, when the box exits the final zone of the segment, a send message is published or broadcast at 232, and a receive message from the next downstream device is waited for at 236. When a receive message is received, the controller sets its successor address as the address in the receive message. The process for the controller then ends at 240.

The process is repeated at each controller. If there are more than one initial segment, such as segments 112 and 114, boxes are placed on both initial segments in serial order. They could be placed in parallel and transferred at the same time if each box were identified in each message such that the controllers would know which box resulted in individual messages, and if the possibility of collisions is reduced or eliminated. If a predecessor has two possible successors, such as initial segment 114, which has successors 124 or 128, the process is executed multiple times, with each controller keeping track of which segment has already received a box from it and directing each succeeding box to a different segment. Storage locations for both predecessor devices exist. In the case where there are downstream segments which branch into further segments, such as segment 124 having downstream segments 120 and 126, each downstream controller could indicate that it has further unexercised segments in either a send or receive message. In that event, upstream controllers could direct succeeding boxes such that all paths are exercised. In an alternative embodiment, controllers could just toggle between multiple downstream paths until all controllers have been configured.

Segment 120 is capable of receiving boxes from multiple upstream segments, 118 and 124. As such, it has additional storage locations for predecessor devices. As the segments are exercised, addresses from the predecessor devices are appropriately stored.

Figure 3:
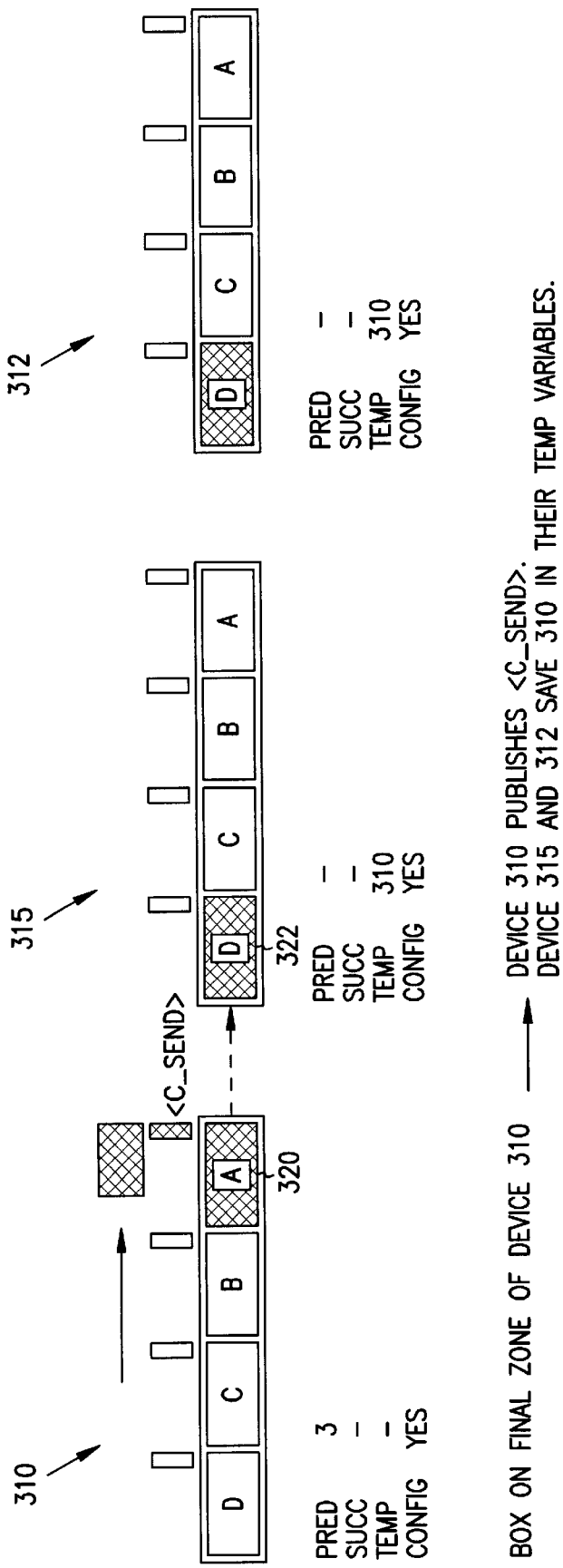
FIG. 3 is a block diagram showing a step involved in the auto configuration of the control modules of FIG. 1.

FIG. 3 shows three controllers in a distributed control system which are to be configured. The controllers are represented as devices 310, 315 and 312, which are physically connected for transport of boxes in that order. Each device comprises multiple zones, D, C, B and A. Zone D is an initial zone, and zone A is a final zone on each device. Each device also has four variables, referred to as Pred, Succ, Temp and Config.

Figure 4:
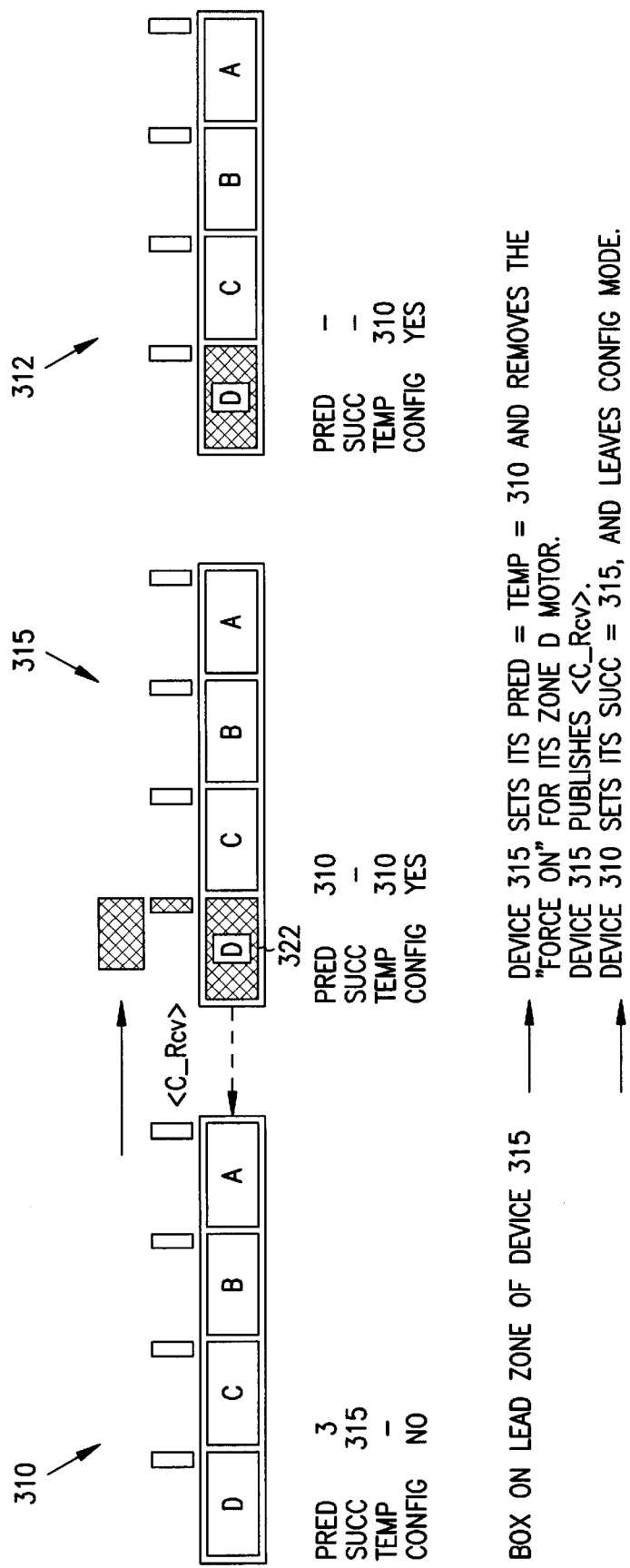
FIG. 4 is a block diagram showing a step involved in the auto configuration of the control modules of FIG. 1.

The autoconfiguration process is described with respect to device 315. After initialization, device 315 waits for send messages from other devices, saving the source address from the most recent message in Temp, which was from device 310. When the box is detected on the lead zone, D, of device 315, the device that published the last send message is deduced to be its predecessor, 310. Device 315 publishes a receive message so its predecessor can determine its successor, as indicated in FIG. 4, where Succ was set to 315 in device 310. Note also that device 310 determined that it should remove the force on for its zone D motor.

Figure 5:
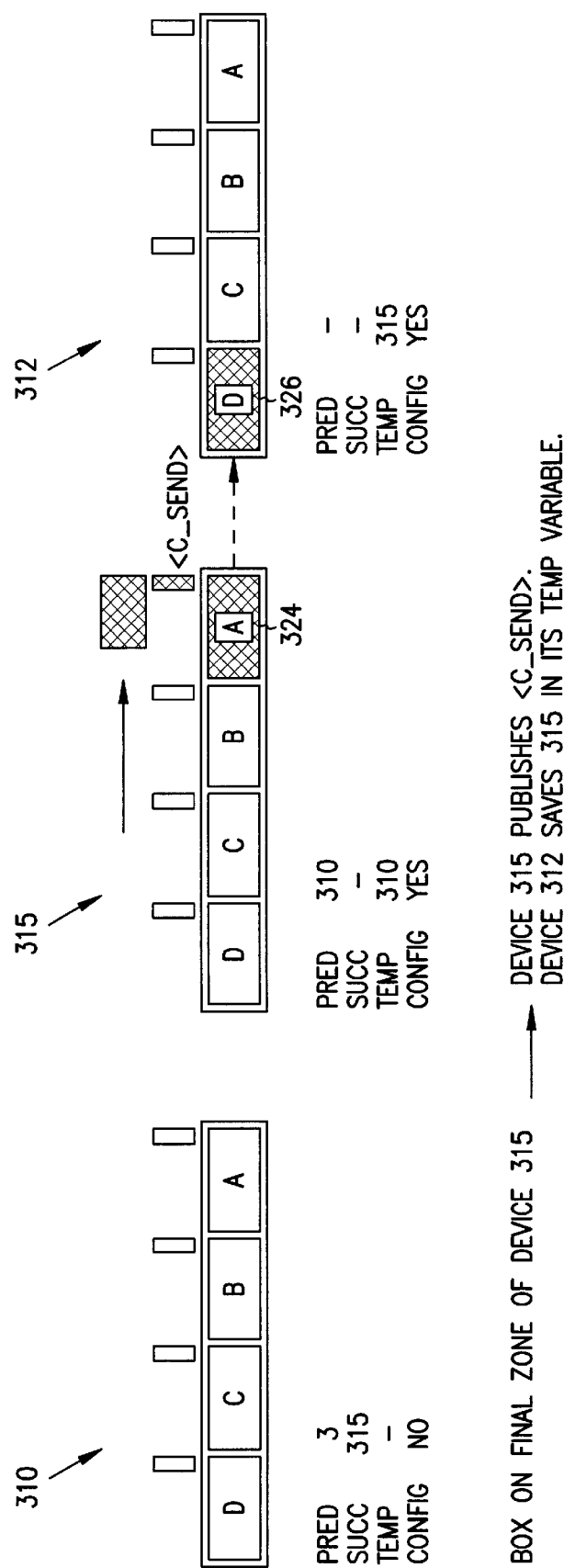
FIG. 5 is a block diagram showing a step involved in the auto configuration of the control modules of FIG. 1.
Figure 6:
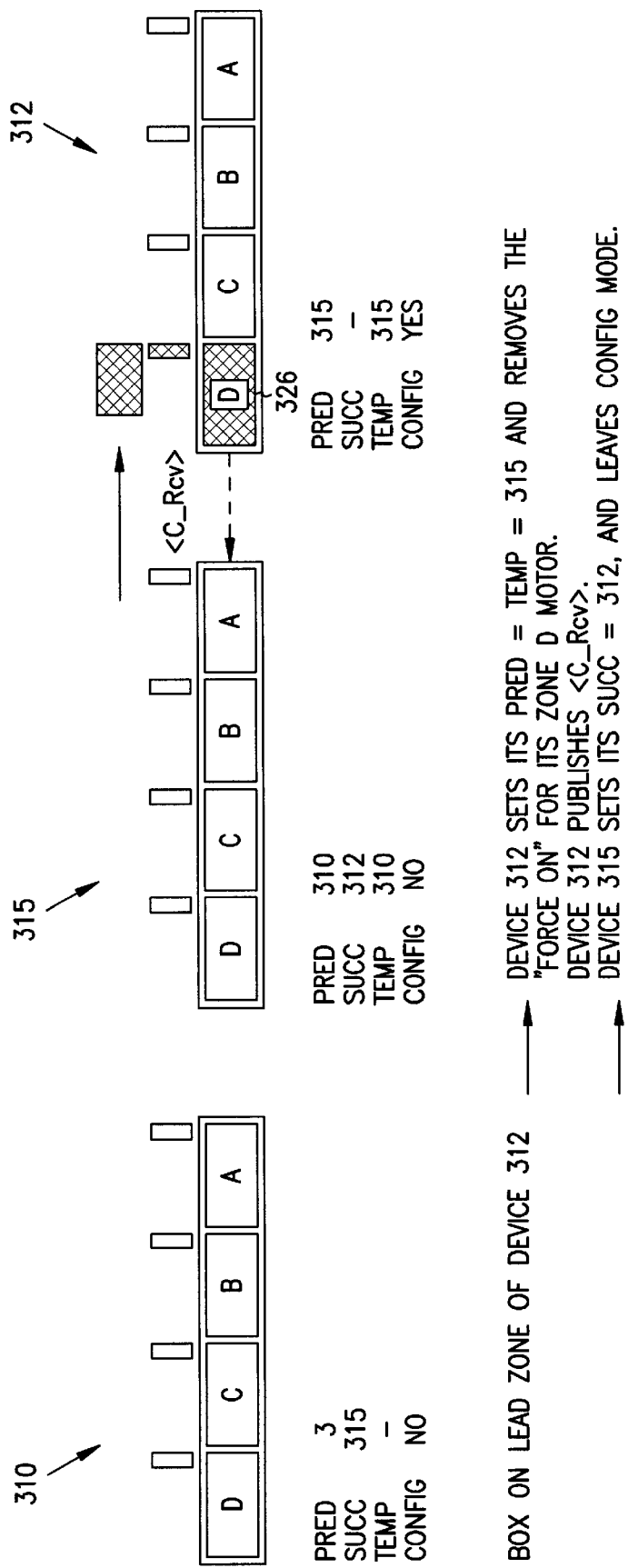
FIG. 6 is a block diagram showing a step involved in the auto configuration of the control modules of FIG. 1.

The box is then passed on to the next device 312 as indicated in FIG. 5. Device 315 then publishes a send message, and device 312 saves the address for device 315 in its Temp variables. Device 312 issues a receive message when it detects the box on its lead zone in FIG. 6 and sets its Pred variable to 315 and removes force on for its zone D motor. Device 312 is deduced to be the successor of the device 315, and the Succ variable of device 315 is set to the address of device 312. At this point device 315 is completely configured and exits the configuration mode.

Autoconfiguration can also be implemented in a system using a centralized controller, such as central controller 140, which may be a personal computer system or other intelligent controller. In the centralized system, device ordering information is contained in an UPSTREAM array and a DOWNSTREAM array indexed by device ID. A single global variable, Config, is used to place the system in configuration mode. When Config is set to a predetermined value, such as "1", any device having either UPSTREAM or DOWNSTREAM values equal to a no device defined value will take action to determine its predecessor and/or successor. Alternatively, a new array, CONFIG could be defined to explicitly place individual devices in configuration mode.

Figure 7:
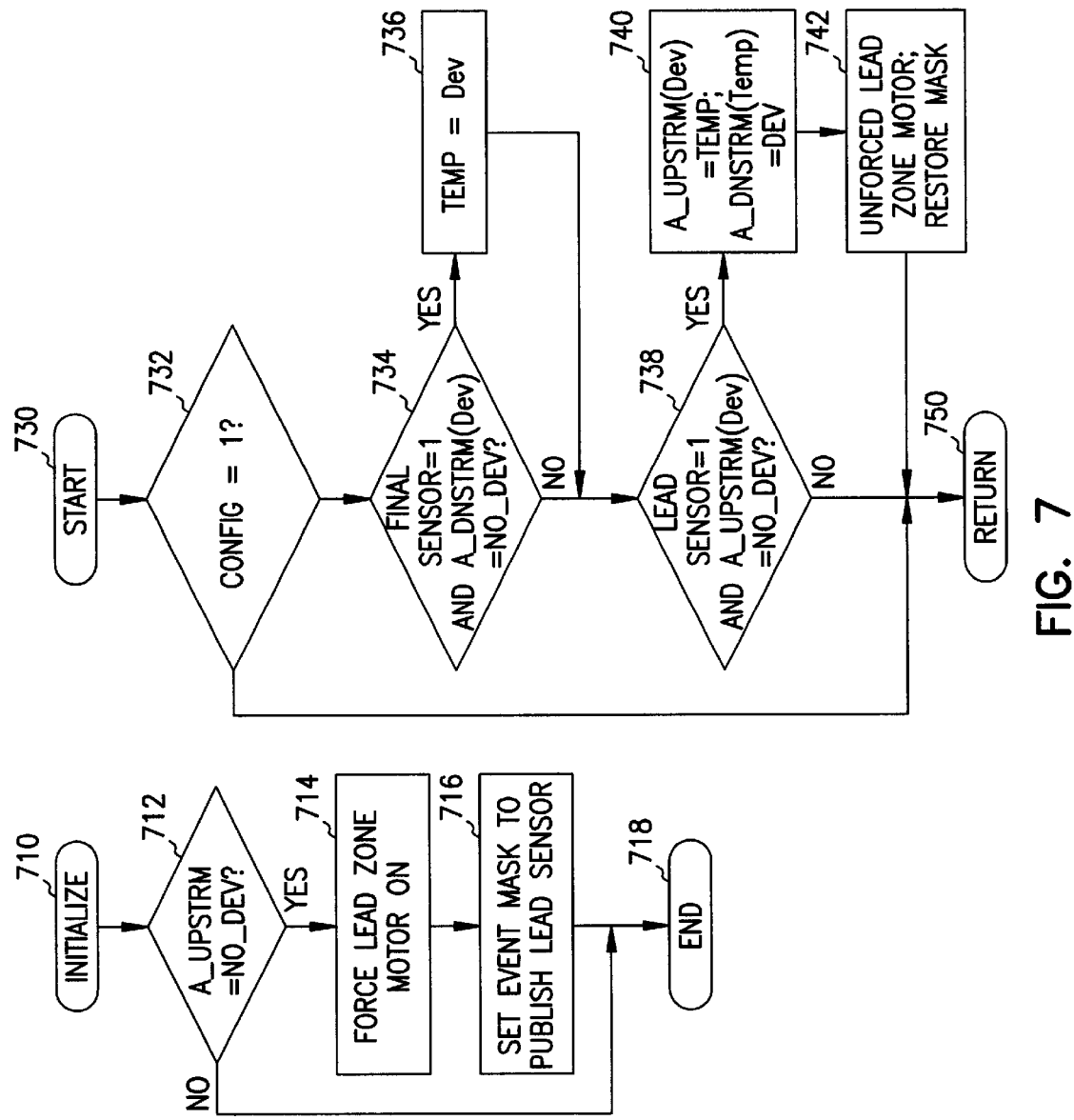
FIG. 7 is a flow chart showing auto configuration of the control modules of FIG. 1.

Flowcharts in FIG. 7 show the operations performed in the autoconfiguration of controllers under central controller control. These actions are executed periodically for each device controlled by the centralized controller. The operations are very similar to those in the distributed control system. The UPSTREAM and DOWNSTREAM arrays replace the Pred and Succ variables on individual devices. A change of value COV message sent to the central controller during normal operation to indicate a box entering or exiting a conveyor segment replaces the receive and send messages of the distributed system.

The system is first initialized as indicated starting at 710. For each device for which the predecessor is undefined at 712, the lead zone motor is forced to run at 714. In addition, a change of value (COV) message event mask is modified to publish a message when a box enters or exits a segment.

At 730 configuration actions are started. As before, with the distributed system, a single box is transferred along a path over the unconfigured devices as determined by checking to see if Config=1 at 732. When a box exits an unconfigured segment, as determined at 734, the device index (Dev) is stored in a global variable, Temp at 736 to save the current device index for downstream devices. When a box enters an unconfigured segment as determined at 738, the most recent value in Temp is deduced to be its predecessor and the last upstream device is defined to be the predecessor device. Similarly, this device is deduced to be the successor of the device with index Temp. At this point, the device can exit configuration mode by removing the force on its lead zone motor and restoring its COV message event mask at 742 and control is returned at 750.

Conclusion

Device configuration information is automatically determined with respect to a physical process that multiple devices monitor or control. The physical process is exercised, with each device tracking progression of the process and determining a preceding device and a successor device. Messages are produced in a configuration mode by each device in a system indicating when some phase of the process monitored by the device begins and ends. Devices operating under control of a central controller, as well as devices implementing a distributed control process can be configured. Autoconfiguration may be accomplished independent of the physical connections of devices, potentially saving time and money in configuring systems.

It is to be understood that the above description is intended to be illustrative, and not restrictive. Many other embodiments will be apparent to those of skill in the art upon reviewing the above description. For instance, the devices may be any type of controller which controls interaction with a physical process. Further, the autoconfiguration process may be initiated at any time during operation of the system as a result of modifying the system or repairing the system. Such autoconfiguration may be applied in many different settings besides conveyor systems. Any physical system implementing a process which has at least some flow to it which can be detected and exercised may make use of the invention. In one embodiment, a grid of motion detectors can be configured by moving entities through the net in different directions, such as selected horizontal and vertical paths. Not all potential paths need be exercised to find a general spatial relationship between sensors. Further embodiment will be apparent to those of ordinary skill in the art. The scope of the invention should, therefore, be determined with reference to the appended claims, along with the full scope of equivalents to which such claims are entitled.

What is claimed is:

1. A method of automatically configuring a plurality of devices associated with a process, the method comprising:

initiating an event in the process;

as each device notices the event, providing a receive message; and providing a send message when the event concludes for the device.

2. The method of claim 1 and further comprising storing an indication of a preceding device.

3. The method of claim 1 and further comprising storing an indication of a succeeding device.

4. The method of claim 1 wherein a central control system stores indications of an ordering of the plurality of devices based on progression of the event.

5. The method of claim 4, wherein the send and receive messages comprise a change of value message sent to the central control system.

6. The method of claim 4 wherein the central control system places each device in a configuration mode prior to the initiation of the event in the process.

7. The method of claim 1 wherein each device stores identifications of succeeding and preceding devices based on the messages.

8. The method of claim 1 wherein events are initiated at multiple entry points in the process.

9. A device which monitors progress of a portion of a physical process, the device comprising:

a sensor that detects progress of the portion of the physical process;

a controller communicatively coupled to the sensor that operates in a normal mode and in an auto configuration mode, wherein two messages are broadcast in auto configuration mode, including a receive message indicating that the physical process is beginning for that portion, and a send message indicating that the physical process has completed for that portion.

10. The device of claim 9, wherein the controller identifies a preceding device in the physical process by receiving a send message from a preceding device immediately before detecting the beginning of the physical process in its associated portion.

11. The device of claim 9 wherein the controller identifies a succeeding device in the physical process by receiving a receive message immediately after detecting the end of the physical process in its associated portion.

* * * * *